United States Patent [19]
Bianchetta et al.

[11] 3,872,883
[45] Mar. 25, 1975

[54] SPOOL-TYPE RELIEF VALVE

[75] Inventors: Donald L. Bianchetta, Coal City; Francis X. Hufeld, Joliet, both of Ill.

[73] Assignee: Caterpillar Tractor Co., Peoria, Ill.

[22] Filed: Sept. 17, 1973

[21] Appl. No.: 397,670

[52] U.S. Cl. ............................................ 137/491
[51] Int. Cl. ........................................... F16k 17/04
[58] Field of Search ...... 139/491, 110, 108; 91/400, 91/436, 461, 452, 419; 137/490, 489.3, 489.5, 489, 596.15, 596.16, 625.64, 625.63

[56] References Cited
UNITED STATES PATENTS

| | | |
|---|---|---|
| 2,917,026 | 12/1959 | Hall et al. .................. 137/596.15 X |
| 3,101,738 | 8/1963 | Horlacher .......................... 137/489 |
| 3,174,410 | 3/1965 | Booth et al. .................... 137/491 X |
| 3,513,877 | 5/1970 | Tennis ....................... 137/596.15 X |

Primary Examiner—Martin P. Schwadron
Assistant Examiner—Robert J. Miller
Attorney, Agent, or Firm—Phillips, Moore, Weissenberger, Lempio & Strabala

[57] ABSTRACT

A spool-type relief valve particularly suited for use in low pressure hydraulic circuits, the hydraulic circuit being selectively communicated with a drain chamber by angularly arranged relief passages formed in a tubular section of the relief valve spool. The relief valve is particularly contemplated for establishing operating pressure in a pilot fluid control circuit.

1 Claim, 2 Drawing Figures

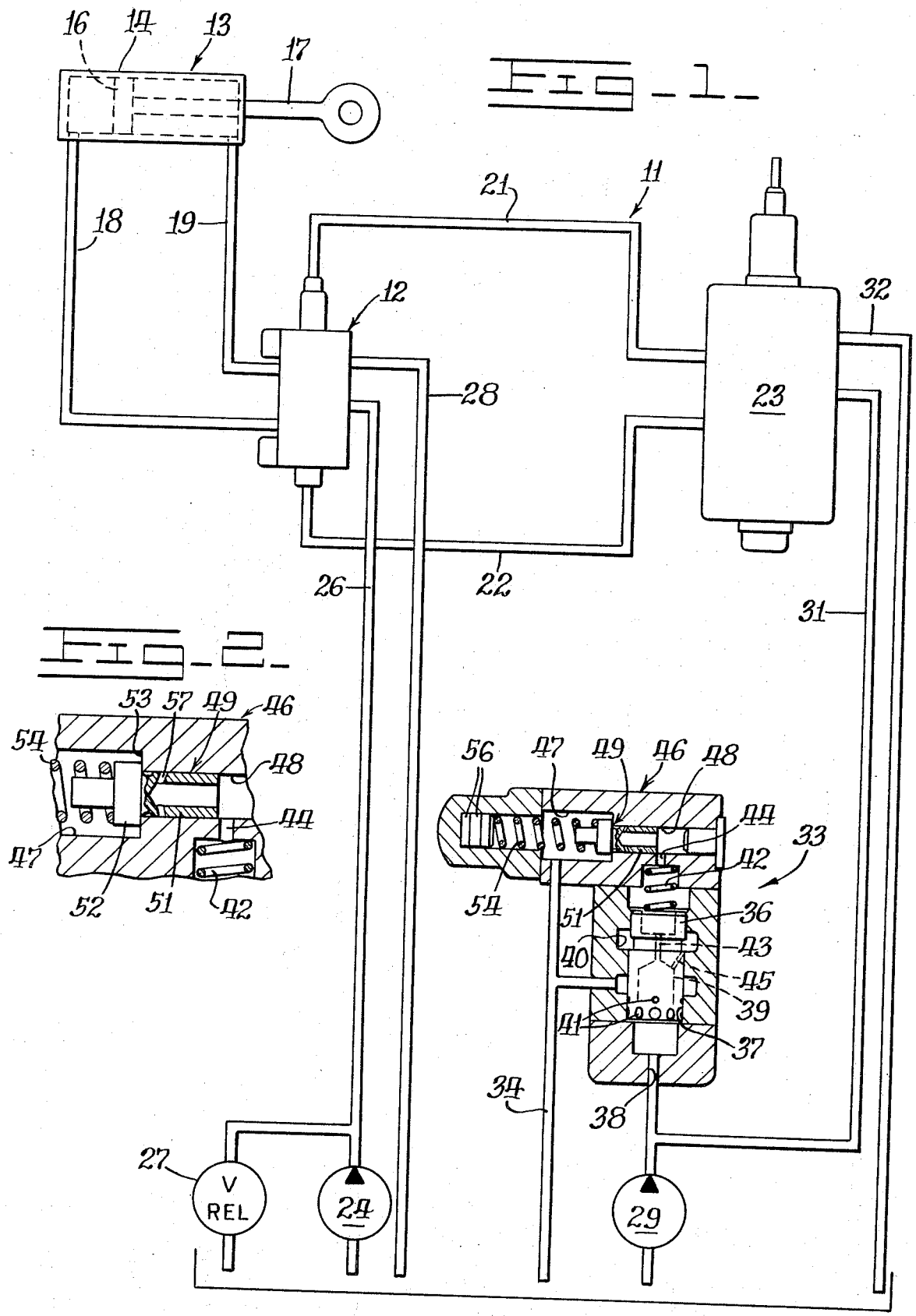

SPOOL-TYPE RELIEF VALVE

BACKGROUND OF THE INVENTION

The present invention relates to a relief valve for low pressure, limited relief flow application and more particularly to such a relief valve adapted for establishing an operating pressure in a pilot control circuit.

Relief valves employed in applications of the type contemplated by the present invention commonly include a conical poppet which is resiliently urged into engagement with a conical valve seat. Poppet relief valves of this type are particularly desirable for applications involving rapid response and accurate pressure regulation. However, such valves have been found to exhibit relative deficiencies, for example, in applications where the valve is continuously moving to accurately maintain a selected pressure. In such applications, the conical poppet may tend to exhibit a relatively erratic and unstable response to fluid pressure with the poppet rapidly cycling into and out of closing relation with the valve seat. This characteristic tends to cause rapid wear which may undesirably result in the leakage across the valve or a change in the pressure setting established by the valve.

SUMMARY OF THE INVENTION

Accordingly, it is an object of the present invention to provide a relief valve exhibiting a relatively stable response in low pressure hydraulic circuits having limited relief flow.

It is a further object of the invention to provide such a relief valve which is particularly adapted for use in pilot control systems.

It is a still further object of the invention to provide such a relief valve wherein relief flow is regulated by a spool movably arranged in a valve bore.

Additional objects are advantages of the invention are made apparent in the following description having reference to the accompanying drawings.

BRIEF DESCRIPTION OF THE DRAWINGS

FIG. 1 is a schematic representation, with parts in section, of a pilot control circuit including a relief valve constructed according to the present invention.

FiG. 2 is a fragmentary, enlarged view, with parts in section, to better illustrate construction of the relief valve.

DESCRIPTION OF THE PREFERRED EMBODIMENT

A pilot control circuit of the type indicated at 11 in FIG. 1 is particularly adapted for regulating a conventional pilot actuated control valve 12 which inturn operates a double-acting hydraulic jack 13. The jack 13 includes a cylinder 14 with a piston 16 being movable therein. A rod 17 is connected to the piston 16 and penetrates through one end of the cylinder 14. The control valve 12 is conventionally coupled with the head end and rod end of the cylinder 14 in a conventional fashion by respective conduits 18 and 19.

Actuating pilot fluid is communicated to respective ends of the control valve 12 by means of conduits 21 and 22. A conventional selector valve 23 may be adjusted to selectively pressurize one or the other of the two conduits 21 or 22 and thus determine the manner in which the jack 13 is operated by the pilot actuated control valve 12.

A pump or source of fluid under pressure 24 is in communication with the control valve 12 by means of an inlet conduit 26. Fluid pressure within the fluid conduit 26 is limited by a relief valve 27. The control valve 12 is operable by pilot fluid pressure in one of the conduits 21 and 22 to communicate the inlet conduit 26 with the hydraulic jack 13 through one of the conduits 18 and 19 while communicating the other of those conduits with a drain conduit 28.

The pilot control circuit includes another pump 29 which provides pilot fluid pressure within a pilot inlet conduit 31. The pilot inlet conduit 31 is normally blocked by the selector valve 23 which is also in communication with drain conduit 32. The selector valve 23 is manually adjustable to communicate one of the pilot conduits 21 and 22 with the inlet conduit 31 while the other pilot conduit is placed in communication with the drain conduit 32.

A relatively low pilot fluid pressure may be employed within the inlet conduit 31. However, it is important that the pressure within the conduit 31 be closely regulated since operation of the control valve 12 is dependent upon the pressure communicated through the pilot conduits 21 and 22 by the selector valve 23. Accordingly, the present invention contemplates a pilot operated relief valve assembly as indicated at 33 for selectively communicating the pilot inlet conduit 31 with a relief drain conduit 34 in order to provide a stable pilot fluid pressure to the selector valve 23.

The pilot operated relief valve 33 includes a spool 36 which is movable within a bore 37. Fluid from the pilot pump 29 is communicated into the valve 33 through a port 38 which is in communication with a tubular end 39 of the spool 36. The tubular portion 39 of the spool includes a series of throttling ports 41 to provide variable communication between the port 38 and the relief drain conduit 34. The spool 36 is urged toward the port 38 by a spring 42 which tends to close communication between the inlet port 38 and the relief conduit 34 across the orifices 41.

An orifice 43 formed by the spool 36 also communicates the inlet port 38 with a small outlet passage 44. An orifice 45 communicates fluid from the end 39 to a balancing and leakage controlling annular recess 40 to facilitate movement of the spool within the bore. Fluid flow through the orifice 43 establishes a differential pressure tending to urge the spool 36 against the spring 42 and thus placing the orifices 41 in variable communication with the relief drain conduit 34. Accordingly, operation of the pilot operated relief valve 33 and pressure within the pilot inlet conduit 31 is closely dependent upon the rate at which fluid is allowed to flow through the orifice 43. The passage 44 is in communication with the relief drain conduit 34 across a relief valve 46 constructed according to the present invention. The relief valve 46 has a relatively large drain chamber 47 in communication with the conduit 34. A smaller bore 48 is in communication with the passage 44 while fluid communication between the bore 48 and the drain chamber 47 is regulated by a relief valve member 49.

The relief valve member 49, shown in greater detail in FIG. 2, includes a tubular section 51 slidably arranged within the bore 48. An enlarged section 52 of the valve member 49 is arranged within the drain chamber 47 and acts against an annular stop surface 53 to limit travel of the tubular section 51 into the bore 48.

A spring 54 is arranged within the drain chamber 47 and tends to urge the relief valve member rightwardly as viewed in FIG. 1 to close off fluid communication from the bore 48 into the drain chamber 47. A plurality of shims 56 (see FIG. 1) may be employed to change the effective length of the spring 54 and thus adjust the force with which it acts upon the relief valve member 49.

Referring again to FIG. 2, low volume fluid communication is provided between the bore 48 and the drain conduit 47 by one or more relief flow passages 57 formed in the tubular section 51 of the relief valve member 49. Preferably, the relief flow passages 57 extend radially in diametrically opposed relation through the tubular section 51. Further, the relief flow of passages 57 which extend radially outwardly through the tubular section 51 are also angled away from the relief chamber 47. The relief flow passages are shown in the drawings as being arranged at an angle of approximately 15°. However, the particular angle between the relief flow passages and the surface 53 for example, is not of critical importance within the present invention. The general angled relation of the relief flow passages, however, has been found to affect movement of the relief valve member 49 and to provide increased stability and fluid pressure regulation for the passage 44.

We claim:

1. A hydraulic pilot control circuit wherein a pilot pressure for operating a control valve is regulated by a pilot operated valve responsive to a pilot pressure developed by a pilot relief valve limiting fluid communication from a pilot passage to a drain passage, the pilot operated valve having an inlet passage in operative communication with the control valve and forming a bore for communicating the inlet passage with the pilot passage, a movable valve member being arranged in the bore and defining an orifice for regulating fluid flow from the inlet passage to the pilot passage, the movable valve member also defining throttle means providing variable communication between the inlet passage and a drain passage, the pilot relief valve including a valve body forming a relief chamber in communication with the drain passage and a bore communicating the relief chamber with the pilot passage, a pilot relief valve member having a tubular section slidably arranged in the pilot relief valve bore, the tubular section being open to the pilot passage and closed from the relief chamber, the pilot relief valve body forming an annular stop surface about the bore in the relief chamber, the pilot relief valve member having an enlarged portion in the relief chamber for engagement with the stop surface, a spring being disposed in the relief chamber for interaction with the pilot relief valve member, the tubular section of the pilot relief valve member forming diametrically opposed, radially extending relief flow passages adjacent its enlarged portion to permit balanced relief flow into the relief chamber as the pilot relief valve member is shifted against the spring, the radially outwardly extending relief flow passages being angled away from the relief chamber, and further comprising, a restrictive passage of relatively reduced size for communicating the pilot passage with the bore in the pilot relief valve body.

* * * * *

Disclaimer 3,872,883.—*Donald L. Bianchetta,* Coal City and *Francis X. Hufeld,* Joliet, Ill. SPOOL-TYPE RELIEF VALVE. Patent dated Mar. 25, 1975. Disclaimer filed Jan. 11, 1985, by the assignee, *Caterpillar Tractor Co.*

Hereby enters this disclaimer to claim 1 of said patent.
[*Official Gazette August 5, 1986.*]